United States Patent [19]

Daniel

[11] Patent Number: 5,556,207

[45] Date of Patent: Sep. 17, 1996

[54] HYDROSTATIC/HYDRODYNAMIC FLYWHEEL BEARING FOR A PRESS

[76] Inventor: Edward A. Daniel, 9300 Holthaus Rd., Fort Loramie, Ohio 45845

[21] Appl. No.: 573,572

[22] Filed: Dec. 15, 1995

Related U.S. Application Data

[63] Continuation of Ser. No. 271,762, Jul. 7, 1994, abandoned.

[51] Int. Cl.⁶ .................................................. F16C 32/06
[52] U.S. Cl. ........................................... 384/115; 100/282
[58] Field of Search .................................. 384/115, 119, 384/113, 135, 373; 100/282

[56] References Cited

FOREIGN PATENT DOCUMENTS

| | | |
|---|---|---|
| 4039911 | 6/1992 | Germany . |
| 4234905 | 8/1993 | Germany . |
| 1199572 | 7/1970 | United Kingdom . |
| 1263349 | 2/1972 | United Kingdom . |
| 1265151 | 3/1972 | United Kingdom . |

*Primary Examiner*—Lenard A. Footland
*Attorney, Agent, or Firm*—Randall J. Knuth

[57] ABSTRACT

A hydrostatic/hydrodynamic flywheel for a press including a flywheel mounted for rotation about a non-rotating quill. A bronze bushing is disposed between the quill and flywheel. Hydrostatic pad areas are located on the quill opposite the bushing. These pad areas are flooded with pressurized oil or liquid to create a hydrostatic bearing area. During operation, flywheel and bearing rotation cause a hydrodynamic bearing effect to occur. The hydrostatic/hydrodynamic bearing eliminates the need for conventional antifriction roller or ball bearings, provides indefinitely long life with full-film lubrication, high shock load capacity, high vibration damping, and a high value of radial and tipping stiffness.

15 Claims, 3 Drawing Sheets

HYDROSTATIC/HYDRODYNAMIC FLYWHEEL BEARING FOR A PRESS

This is a continuation of application Ser. No. 08/271,762, filed Jul. 7, 1994, now abandoned.

BACKGROUND OF THE INVENTION

The present invention relates to mechanical presses and in particular to flywheels subjected to press vibration, shock and long periods between clutch actuation.

Mechanical presses such as straight side presses and gap frame presses for stamping and drawing comprise a frame having a crown and bed and a slide supported within the frame for reciprocal motion toward and away from the bed. The slide is driven by a crankshaft having a connecting arm connected to the slide, to which is mounted the upper die. The lower die is mounted to a bolster which, in turn, is connected to the bed. Such mechanical presses are widely used for blanking and drawing operations and vary substantially in size and available tonnage depending on their intended use.

The primary source for stored mechanical energy and mechanical presses is the flywheel. The flywheel is located between the main drive motor and the clutch. The flywheel and flywheel bearing are mounted on either the driveshaft, crankshaft, or the press frame by use of a quill. The main drive motor replenishes the energy lost from the flywheel during press stamping operations when the clutch couples the flywheel to the press driven parts. During engagement of the clutch, the flywheel drops in speed and the press driven parts come up to press running speed. During engagement with the clutch, the flywheel rotates in unison with the clutch while the flywheel bearings have no relative rotation, except in the case of use of a quill where relative rotation is always present.

Prior art presses have a flywheel design where the flywheel is mounted to its support by means of anti-friction roller or ball bearings. Bearings of this type have characteristics of low lubrication requirements, low viscous drag, and a statistically predictable lifetime. These types of bearings have particular weaknesses to vibration and shock which may cause brinelling, false brinelling, fretting corrosion and damage to the bearing races, hub bores and shaft.

SUMMARY OF THE INVENTION

The present invention overcomes the disadvantages inherent in prior art presses having anti-friction roller or ball bearings by providing the flywheel with a bronze bushing and a sufficient quantity of fluid or oil to prevent contact between the load carrying surfaces, thereby creating full film lubrication between the parts. A hydrodynamic journal bushing is created that requires relative rotation between the bushing and journal to develop a load carrying pressure film. In order to achieve this requirement, the invention is mounted upon a quill that is non-rotatably attached to the press frame.

Under shock loading during press operation, the oil film created supports the load by virtue of a squeeze-film effect within the bushing clearance. Since oil cannot escape through the diminishing clearance space during the time when the load is active, a load carrying pressure is generated resisting further reduction to the oil film thickness. The load is thereby carried without damage to the bearing and journal surfaces. This permits the bushing to have a high overload capacity and high inherent vibration damping.

An advantage of the hydrostatic/hydrodynamic flywheel bearing of the present invention is that it provides for a long bearing life with full film lubrication while at the same time having a high load capacity versus its physical size. As known with hydrodynamic bearings, the load capacity increases with an increase in relative rotational speed.

A further advantage of the hydrostatic/hydrodynamic flywheel bearing of the present invention is that the hydrostatic pads incorporated in the invention prevent metal to metal contact while including a high rate of stiffness to positively locate the load carrying bushing, centrally about its journal. When the drive belt is engaged, it exerts a steady upward load on the flywheel creating a tendency to close out the bushing clearances. The hydrostatic pads of the present invention prevent this bushing clearance close out.

Yet a further advantage of the hydrodynamic/hydrostatic flywheel bearing of the present invention is that it prevents edge loading of the bushing. When the press engages, it may not engage squarely on the axis of rotation of the flywheel thereby cocking the flywheel in its clearance. Two rows of hydrostatic pads on the quill operate to give the flywheel sufficient tipping resistance, permitting it to run true.

The invention, in one form thereof, provides a flywheel bearing for supporting a flywheel assembly of a machine press, the bearing comprising a quill assembly having a quill nonrotationally connected to the press, a bearing bushing having an internal bore which forms a bearing surface disposed about the quill with a clearance, the quill including a plurality of hydrostatic bearing pads that open toward the bearing surface, a pump in communication to the hydrostatic bearing pads to supply pressurized fluid thereto, the pump supplying sufficient fluid to create both a hydrostatic bearing and a hydrodynamic bearing between the bearing bushing and the quill.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
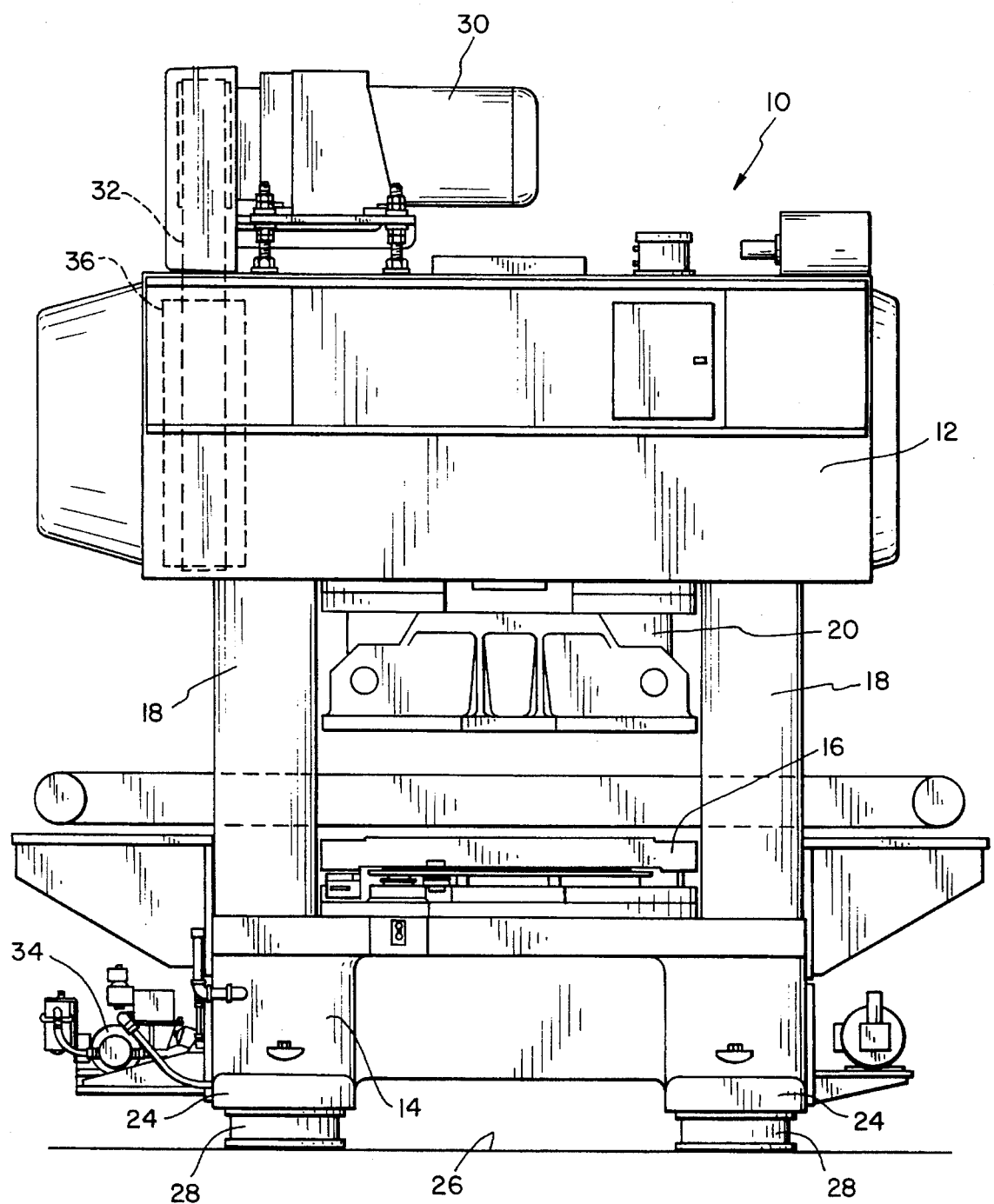
FIG. 1 is an front elevational view of a press to which the present invention pertains.

Referring now to FIG. 1, mechanical press 10 comprises a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for reciprocating movement. Tie rods (not shown), extending through crown 12, uprights 18 and bed portion 14, are attached at each end with tie rod nuts (not shown). Leg members 24 are formed as an extension of bed 14 and are generally mounted on shop floor 26 by means of shock absorbing pads 28. A drive press motor 30, part of the drive mechanism, is attached by means of a belt 32 to main flywheel 36. Quill 42 is attached by bolts 44 to press frame or crown 12. Flywheel 36 is rotatable about quill 42 and is connected to crankshaft 46 by a conventional combination clutch/brake assembly (not shown for clarity). The press crankshaft 46 rotates within quill 42. Crankshaft seal 48 retains oil within press crown 12. As is known in conventional press art, crankshaft 46 is further connected to slide by connecting rods to cause rotational energy of crankshaft 46 to be translated into reciprocating movement of slide 20. The present invention pertains to a bearing assembly 40 located on quill 42 on which flywheel 36 rotates. Bearing assembly 40 includes a bronze bushing 54 disposed between quill 42 and a flywheel hub 56. Flywheel hub 56 is attached to flywheel web 58 of flywheel 36 by bolts (not shown). Alternatively, flywheel hub may be an integral piece with flywheel web 58 or with entire flywheel 36.

Figure 2:
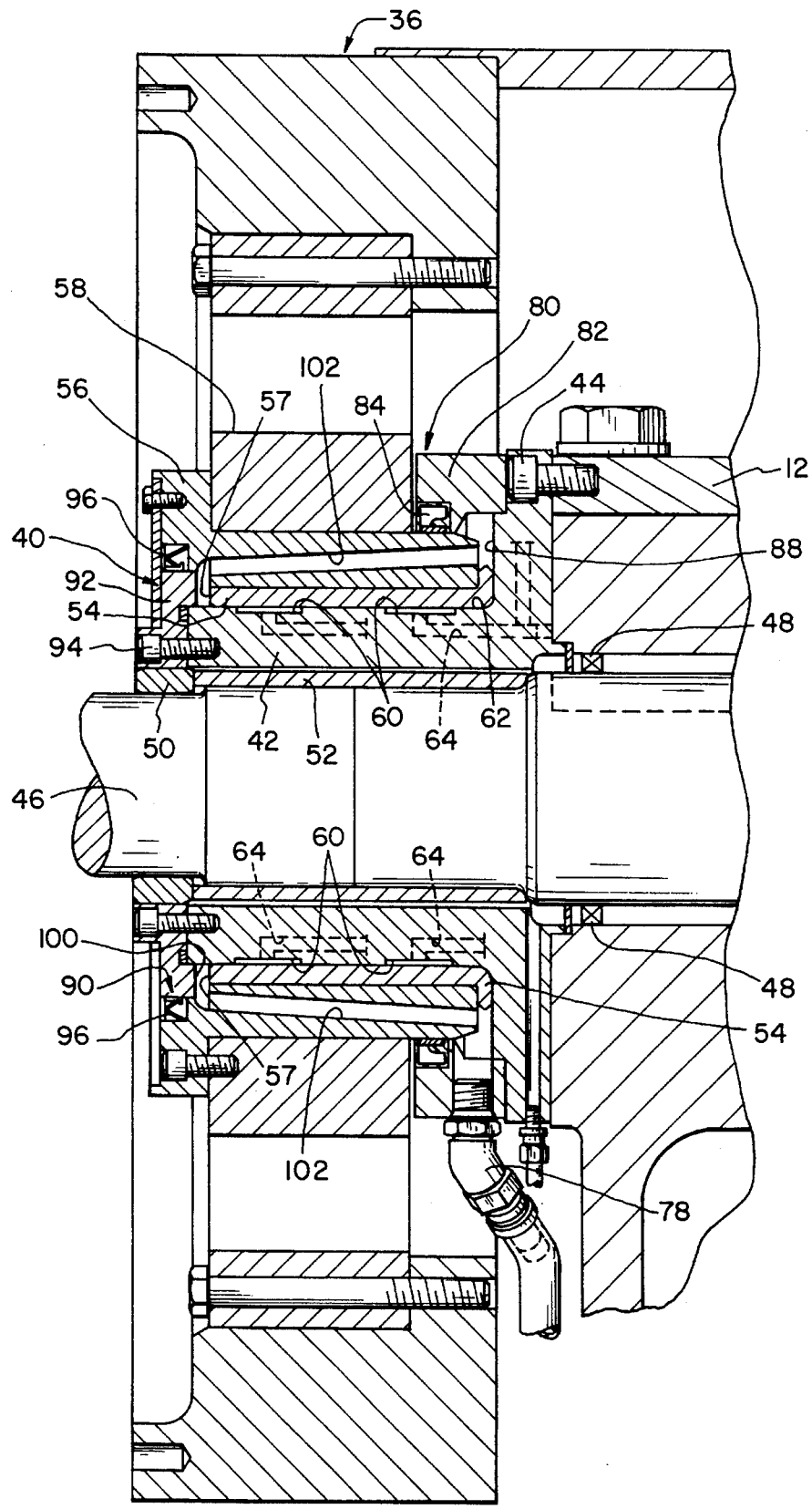
FIG. 2 is a side sectional view of the hydrodynamic/hydrostatic flywheel bearing of one form of the present invention.
Figure 3:
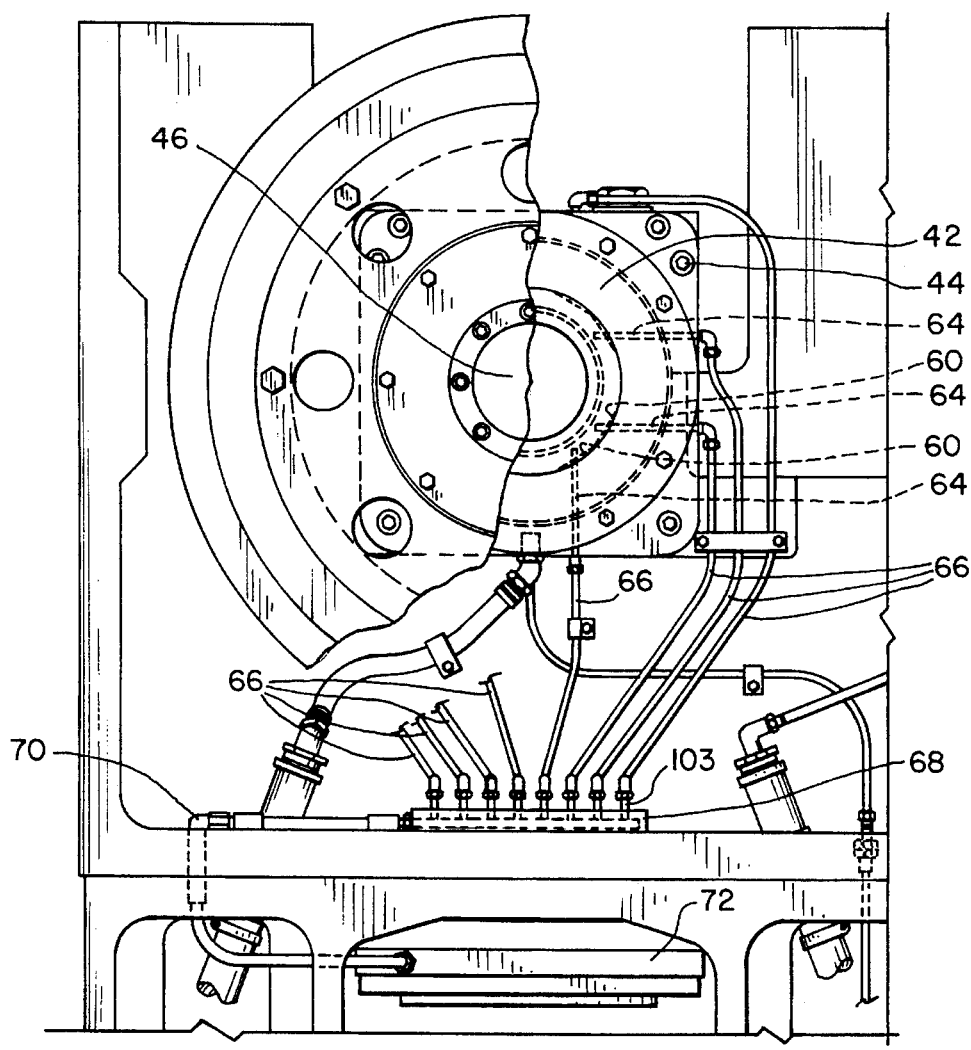
FIG. 3 is an fragmentary end view of the hydrodynamic/hydrostatic flywheel bearing of one form of the present invention.

The present invention includes the use of hydrostatic pad areas 60 formed on the outside surface 62 of quill 42. As shown in FIG. 2, there are two rows of hydrostatic pads 16 incorporated on the quill. In the preferred embodiment, oil is used for lubrication between moving parts but equivalently other liquids or fluids may be utilized. Oil is supplied through oil conduits 64 drilled through quill 42. As shown in FIG. 3, these oil conduits 64 are connected to a plurality of external oil lines 66 receiving oil via orifices 103 from a manifold 68. Oil manifold 68 is connected by an oil feed line 70 to a reservoir of pressurized oil 72. A hydraulic oil pump 74 is used to pressurize oil or fluid within reservoir 72 thereby causing pressurized fluid to flow through oil feed line 70, oil manifold 68, orifice 103, and oil line 66. This oil then flows through oil conduits within quill 42.

Figure 4:
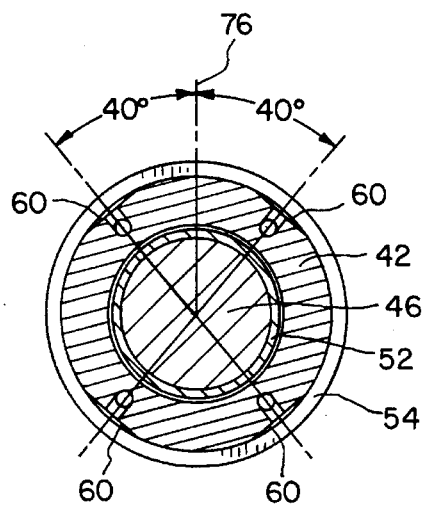
FIG. 4 is a cross sectional view of an alternate embodiment of the bushing quill.
Figure 5:
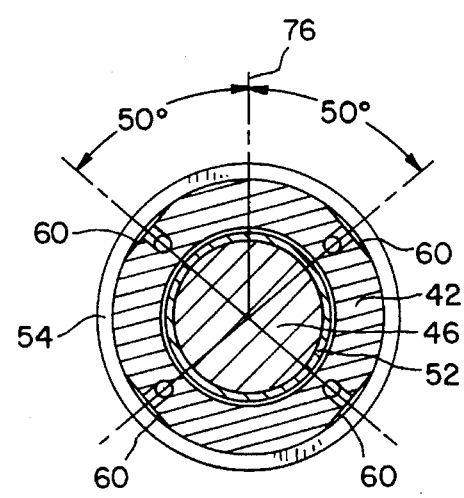
FIG. 5 is a cross sectional view of an alternate embodiment of the bushing quill.

The two rows of hydrostatic pads 60 may be oriented in different ways to maximize the load carrying capacity of bearing assembly 40. One preferred method is to arrange the hydrostatic pads as shown in FIG. 4 so that pads 60 are located approximately 40° from a vertical line 76 passing through both quill 42 and crankshaft 46. Additionally pads 60 may be oriented as shown in FIG. 5 at approximately up to 50° from vertical line 66. Alternatively, different orientations of pad 60 about quill 42 may change load carrying capacity of the quill and the hydrodynamic bearing in particular.

The combination of a sufficient quantity of liquid such as oil to permit full-film lubrication and the hydrostatic pads 60 filled with a pressurized liquid such as oil between quill 42 and bronze bushing 54 creates a hydrostatic/hydrodynamic bearing assembly 40 with a load supporting capability that increases with relative rotational speed between quill 42 and flywheel 36. Pressurized oil within hydrostatic pad area 60 increases the stiffness of the assembly to positively locate the load carrying members and particularly flywheel 36 and bronze bushing 54 about quill 42. Hydrostatic pads 60 and sufficient quantity of liquid such as oil ensure that no metal to metal contact occurs, thereby eliminating wear. A high capacity pump 74 such as a Parker H77AA2A Gear Pump insures that a large supply of oil is available for both creating the hydrostatic pressure areas between quill 42 and bronze bushing 54 while creating full-film conditions for the hydrodynamic effect between portions of quill 42.

In operation, the present invention of bearing assembly 40 will allow flywheel 36 to rotate about non-rotational quill 42. Pump 74 will supply pressurized fluid in sufficient quantity through oil conduit 64 into hydrostatic pad area 60 to create both a hydrostatic bearing and a hydrodynamic bearing between the bronze bushing 54 and quill 42. This oil pumped to hydrostatic pad area 60 will flow axially along the outside surface 62 of quill 42 and flow to a drain hose 78 attached to a portion of quill 42 adjacent flywheel web 58. A rear seal assembly 80 formed annularly about flywheel hub 56 and quill 42 seals oil escaping from the inner face of bronze bushing 54 and quill 42 into drain 78. Rear seal assembly 80 includes an annular retainer 82 attached non-rotationally to quill 42. A rear seal 84 interfits between retainer 82 and flywheel hub 56 to localize the fluid leaking from hydrostatic pad areas 60. Along the opposite side of bronze bushing 54 is an annular retainer 92 attached by bolts 94 to quill 42. Retainer 92 retains flywheel 36 axially onto quill 42. Front seal 96 interfits between flywheel hub 56 and retainer 92. As shown in FIG. 2, front seal 96 prevents liquid from leaking between non-rotating retainer 92 and rotating hub 56. Between the front radial surface 57 of bronze bushing 54 and the rear radial surface 100 of retainer 92 is an axial clearance in which oil leaking out of hydrostatic pads 60 collects.

The rear radial surface 100 of retainer 92 includes a plurality of radial grooves (not shown) formed in the surface to allow fluid to pass and flow into a fluid collection channel 102 within hub 56 to connect a clearance space formed between bushing 54 and retainer 92, and rear fluid space 88. Fluid collection channel 102 is formed at an angle to the center of rotation of crankshaft 46 thereby causing any fluid leaking into the front clearance space between surfaces 57 and 100 to flow back toward fluid space 88 and on into drain hose 78. Fluid flowing through drain hose 78 is eventually directed to the inlet side of pump 74 for recirculation through bearing assembly 40.

Additionally, both front seal 96 and rear seal 84 are not positioned in the same plane as the bronze bushing 54 or its clearance with quill 42 so that when fluid is released or ejected from an end of bushing 54, seals 84 and 96 are not directly in the path of the fluid, thereby improving the sealing characteristics of bearing assembly 40.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mechanical press comprising:

a frame structure with a crown and a bed;

a slide for reciprocating movement in opposed relation to said bed;

a flywheel assembly rotatably driven by a drive mechanism, said flywheel assembly including a flywheel rotatable relative to said frame structure;

a crankshaft rotatably disposed within said crown and in driving connection with said slide, said crankshaft selectively connectable with said flywheel for driving rotation thereby; and a flywheel bearing supporting said flywheel assembly, said bearing comprising:

a quill assembly having a quill nonrotationally connected to the press;

a bearing bushing connected to said flywheel assembly and having an internal bore which forms a bearing surface disposed about said quill with a clearance, said quill including a plurality of hydrostatic bearing pads that open toward said bearing surface, said bearing bushing having relative rotation with said quill during press operation;

a pump in communication to said hydrostatic bearing pads to supply pressurized fluid thereto, said pump supplying sufficient fluid to create both a hydrostatic bearing and a hydrodynamic bearing between said bearing bushing and said quill; and wherein said plurality of bearing pads are located in at least two rows separated by an axial distance about said quill, whereby tipping of said flywheel is resisted.

2. The flywheel bearing of claim 1 further including an oil drain, said bearing bushing having a sharp edged slinger whereby fluid leaking past said bearing bushing is slung into said oil drain.

3. The press of claim 1 further including a plurality of seals sealing between said quill assembly and the flywheel assembly, said seals positioned in a different plane than that of said bushing clearance.

4. The press of claim 1 in which said plurality of bearing pads are located equally spaced about said quill.

5. The press of claim 1 in which said plurality of bearing pads are located 40 degrees from vertical about said quill.

6. A mechanical press comprising:

a frame structure with a crown and a bed;

a slide for reciprocating movement in opposed relation to said bed;

a flywheel assembly rotatably driven by a drive mechanism, said flywheel assembly including a flywheel rotatable relative to said frame structure;

a crankshaft rotatably disposed within said crown and in driving connection with said slide, said crankshaft selectively connectable with said flywheel for driving rotation thereby; and a flywheel bearing supporting said flywheel assembly, said bearing independent of rolling contact antifriction bearings and comprising:

a quill assembly having a quill nonrotationally connected to the press;

a bearing bushing connected to said flywheel assembly and having an internal bore which forms a bearing surface disposed about said quill with a clearance, said quill including a plurality of hydrostatic bearing pads that open toward said bearing surface, said bearing bushing having relative rotation with said quill during press operation;

a pump in communication to said hydrostatic bearing pads to supply pressurized fluid thereto, said pump supplying sufficient fluid to create both a hydrostatic bearing and a hydrodynamic bearing between said bearing bushing and said quill.

7. A mechanical press comprising:

a frame structure with a crown and a bed;

a slide for reciprocating movement in opposed relation to said bed;

a flywheel assembly rotatably driven by a drive mechanism, said flywheel assembly including a flywheel rotatable relative to said frame structure;

a crankshaft rotatably disposed within said crown and in driving connection with said slide, said crankshaft selectively connectable with said flywheel for driving rotation thereby; and a flywheel bearing for supporting said flywheel assembly, said bearing comprising:

a quill nonrotationally connected to the press;

a bearing bushing having an internal bore which forms a bearing surface disposed about said quill with a clearance, said quill including a plurality of hydrostatic bearing pads that open toward said bearing surface, said bearing bushing being rigidly connected to said flywheel assembly and having relative rotation with said quill during press operation;

a pump in communication to said hydrostatic bearing pads to supply pressurized fluid thereto, said pump supplying sufficient fluid to prevent contact between said bushing and said quill and create a full lubricant film therebetween; and wherein said plurality of bearing pads are located in at least two rows separated by an axial distance about said quill, whereby tipping of said flywheel is resisted.

8. The press of claim 7 further including an oil drain, said bearing bushing having a sharp edged slinger whereby fluid leaking past said bearing bushing is slung into said oil drain.

9. The press of claim 7 further including a plurality of seals sealing between said quill and the flywheel assembly, said seals positioned in a different plane than that of said bushing clearance.

10. The press of claim 7 in which said plurality of bearing pads are located equally spaced about said quill.

11. The press of claim 7 in which said plurality of bearing pads are located 40 degrees from vertical about said quill.

12. A flywheel bearing supporting a flywheel assembly of a machine press, said bearing comprising:

a quill nonrotationally connected to the press;

a bearing bushing having an internal bore which forms a bearing surface disposed about said quill with a clearance, said quill including a plurality of hydrostatic bearing pads that open toward said bearing surface, said bearing bushing having relative rotation with said quill during press operation;

a pump in communication to said hydrostatic bearing pads to supply pressurized fluid thereto, said pump supplying sufficient fluid to prevent contact between said bushing and said quill and create a full lubricant film therebetween; and wherein said plurality of bearing pads are located in two rows separated by an axial distance about said quill, whereby edge loading of said bearing bushing is prevented.

13. A flywheel bearing supporting a flywheel assembly of a machine press, said bearing comprising:

a quill nonrotationally connected to the press;

a bearing bushing having an internal bore which forms a bearing surface disposed about said quill with a clearance, said quill including a plurality of hydrostatic bearing pads that open toward said bearing surface, said bearing bushing having relative rotation with said quill during press operation;

a pump in communication to said hydrostatic bearing pads to supply pressurized fluid thereto, said pump supplying sufficient fluid to prevent contact between said bushing and said quill and create a full lubricant film therebetween; and an oil drain, said bearing bushing having a sharp edged slinger whereby fluid leaking past said bearing bushing is slung into said oil drain.

14. The mechanical press of claim 1 further comprising at least two fluid lines for supplying pressurized fluid to said bearing pads from said pump and including a first fluid line and a second fluid line, wherein said first fluid line includes an orifice and opens into a first bearing pad in one row of said at least two rows of bearing pads, wherein said second fluid line includes an orifice and opens into a second bearing pad axially spaced from said first bearing pad and in another row of said at least two rows of bearing pads, and wherein a portion of said first fluid line extending between said first fluid line orifice and said first bearing pad is separate from a portion of said second fluid line extending between said second fluid line orifice and said second bearing pad.

15. The mechanical press of claim 14 wherein said first and second fluid lines comprise a common manifold in flow communication with said pump, and wherein said manifold is disposed along a fluid flow path between said pump and said first and second fluid line orifices.

* * * * *